W. H. SMITH.
VALVE FOR CORROSIVE LIQUIDS.
APPLICATION FILED DEC. 26, 1918.

1,331,534.

Patented Feb. 24, 1920.

Inventor
William H. Smith
By Hull Smith Brock & West
attorneys

UNITED STATES PATENT OFFICE.

WILLIAM H. SMITH, OF EAST CLEVELAND, OHIO.

VALVE FOR CORROSIVE LIQUIDS.

1,331,534.   Specification of Letters Patent.   Patented Feb. 24, 1920.

Application filed December 26, 1918. Serial No. 268,226.

*To all whom it may concern:*

Be it known that I, WILLIAM H. SMITH, a citizen of the United States, residing at East Cleveland, in the county of Cuyahoga and State of Ohio, have invented a certain new and useful Improvement in Valves for Corrosive Liquids, of which the following is a full, clear, and exact description, reference being had to the accompanying drawings.

This invention relates to valves and has particular reference to a valve for acids and other corrosive liquids. The valves used in chemical plants have hitherto usually been of the turning plug type owing to the quick opening and closing, to the greater ease of manufacturing them out of acid-resisting materials, and to the fact that packing is not necessary. Yet leakage is very troublesome, the valves wear so as to lose their tightness, are easily broken, and frequently cause trouble by sticking. The object of my invention is the provision of a new and improved construction of valve which shall possess the same quick opening and closing features as the turning plug together with superior resistance to leakage and equal facility of manufacture from acid-proof substances.

Figure 1:
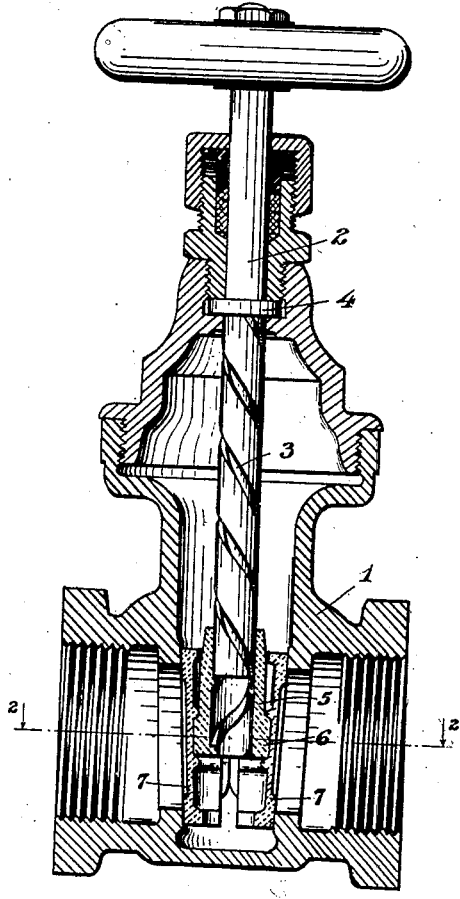
Figure 2:
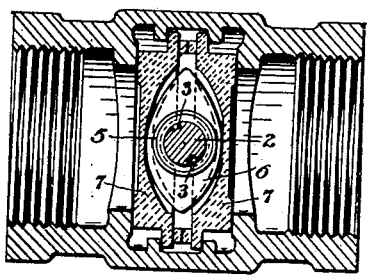
Figure 3:
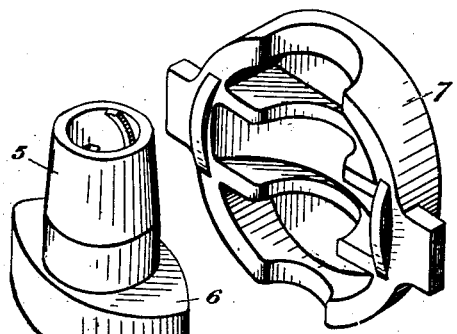
Figure 4:
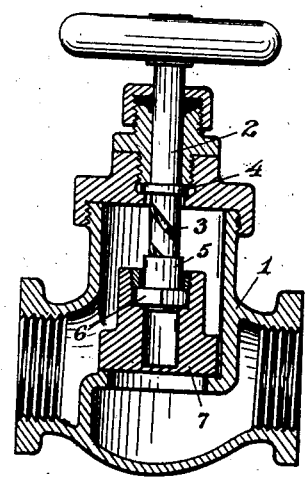
Figure 5:
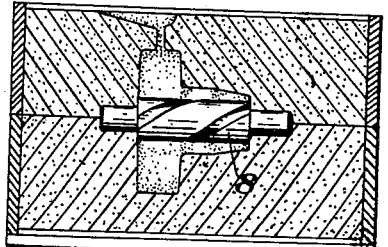

In the drawings accompanying and forming a part of this application I have shown certain physical forms in which my invention can be embodied although it will be understood that these are only illustrative and do not limit me to the specific structures therein depicted. In these drawings, Figures 1 and 2 are sectional views of a valve constructed in accordance with my invention; Fig. 3 is a detail perspective view of the valve parts; Fig. 4 is a sectional view of a different type of valve embodying my invention; and Fig. 5 illustrates the method of forming the valve-nut.

Describing by reference characters the parts shown in the drawing, 1 represents the valve casing which may be of any acid resisting metal or alloy, or it may be of any suitable metal coated with resistant material. As an example of the former I will instance the use of an alloy of iron and chromium, and of the latter, iron coated with lead.

Rotatably mounted in the casing as a stem 2 having therein the plural pitched quick-acting thread 3, said stem being made of some rigid, acid-resisting alloy such as one of iron and chromium and being held against longitudinal movement by suitable means such as the flange 4. Threaded on the stem is the nut 5, having the enlarged head 6, which engages the valve member 7. The latter can be of any suitable shape, such as the sliding gates shown in Figs. 1 to 3 or the compression-head shown in Fig. 4, and can be of ceramic material, acid proof alloy, or common metal covered with resistant substance, and may be either hard or soft as desired since it need not have any machining nor endure any particular mechanical wear.

The nut 5, however, must be of sufficient hardness to withstand the wear of the screw, and is also very difficult to machine, partly because of the fact that the only known alloys of sufficient resistance to acid corrosion are extremely hard and partly because of the fact that a multiple pitched thread of abrupt slope such as is shown here is peculiarly difficult to machine. For these reasons I form the same by casting directly in a mold around a core 8 threaded to correspond with the stem, which avoids all difficulties connected with the hardness of the metal and the difficulty of machining such abrupt and widely spaced threads.

Having thus described my invention, what I claim is:—

1. The combination with a valve having a corrosion resisting casing and a seat therein, of a stem of non-corrodible alloy having a multiple thread and a cast nut of non-corrodible material adapted to be threaded on said stem.

2. The combination with a valve having a corrosion resisting casing and a seat therein, of a stem of non-corrodible alloy having a multiple thread and a cast nut of non-corrodible material threaded on said stem, said nut being adapted to be held from rotary movement.

In testimony whereof I hereunto affix my signature.

WILLIAM H. SMITH.